United States Patent [19]

Robbins, III

[11] Patent Number: 4,816,093

[45] Date of Patent: Mar. 28, 1989

[54] SEPARABLE LAMINATE CONTAINER

[76] Inventor: Edward S. Robbins, III, 459 N. Court, Florence, Ala. 26360

[21] Appl. No.: 100,845

[22] Filed: Sep. 25, 1987

[51] Int. Cl.$^4$ .......................... B29C 49/22; B65B 7/06
[52] U.S. Cl. .......................................... 156/69; 53/140; 53/170; 53/175; 156/227; 156/267; 156/244.14; 156/244.19; 156/308.4; 215/12.1; 220/403; 264/515; 264/524; 264/534; 264/536
[58] Field of Search ............... 264/515, 524, 525, 536, 264/537, 531, 534; 215/12.1; 220/403; 53/140, 170, 175; 156/69, 227, 267, 244.14, 244.19, 308.4

[56] References Cited

U.S. PATENT DOCUMENTS

| 1,846,748 | 0/1932 | Palmer . | |
|---|---|---|---|
| 2,011,179 | 0/1935 | Krout . | |
| 2,920,967 | 0/1960 | Heinemann . | |
| 3,055,568 | 0/1962 | Zalkind . | |
| 3,101,839 | 0/1963 | Holman . | |
| 3,249,286 | 0/1966 | Palmer . | |
| 3,269,643 | 0/1966 | McDowell . | |
| 3,321,070 | 0/1967 | Childs . | |
| 3,324,214 | 6/1967 | Schaich | 264/515 |
| 3,648,882 | 0/1972 | Shelton . | |
| 3,896,991 | 0/1975 | Kozlowski et al. . | |
| 3,929,275 | 0/1975 | Bolling et al. . | |
| 4,064,302 | 0/1977 | Kozlowski et al. . | |
| 4,065,049 | 0/1977 | Achelpohl et al. . | |
| 4,151,318 | 0/1979 | Marshall . | |
| 4,174,804 | 0/1979 | Bosse . | |
| 4,303,710 | 0/1981 | Bullard et al. . | |
| 4,357,191 | 0/1982 | Bullard et al. . | |
| 4,405,557 | 9/1982 | Lehnard | 264/515 |
| 4,459,793 | 0/1984 | Zenger . | |
| 4,510,115 | 4/1985 | Gokcen et al. | 264/515 |

FOREIGN PATENT DOCUMENTS 0182094 5/1986 Fed. Rep. of Germany ...... 264/515

OTHER PUBLICATIONS

Bekum's brochure entitled "Co-Ex"; Coextrusion Multi-Layer Process.
Bekum's brochure entitled "Coextrusion"; Advances in blow moulding technology.

Primary Examiner—Jan H. Silbaugh
Assistant Examiner—Neil M. McCarthy
Attorney, Agent, or Firm—Nixon & Vanderhye

[57] ABSTRACT

A process for forming a separable laminate container includes the steps of coextruding at least two substantially non-adhering thermoplastic compositions to form a tubular parison having a relatively thick outer layer and a relatively thin inner layer. The parison is subsequently blow molded and trimmed to provide an open-ended container body and an inner liner which is separable along the interior walls of the container body to permit closing and/or sealing of the liner, independent of the container. A lid may also be applied to the container body.

29 Claims, 5 Drawing Sheets

SEPARABLE LAMINATE CONTAINER

BACKGROUND AND SUMMARY OF THE INVENTION

This invention relates to containers in general and, specifically, to lined containers wherein the inner liner may be sealed separately and independently of the container itself. Such containers are most often utilized in the packaging of solid and liquid food products or the like, but have use in other areas as well. In the food industry, liners are also utilized as barriers to prevent undesirable chemical interaction between the container material and the container contents. Of course, containers of the type described may be employed wherever it is desired to seal the contents against air and moisture, or to prevent leakage from within, such as in the health care, pharmaceutical and other industrial packaging markets.

In the past, containers incorporating separately closable and/or removable liners have involved costly and time consuming production, particularly since a multi-step manufacturing process has been required. For example, in U.S. Pat. No. 3,321,070, a package for a liquid coating material is disclosed which contains a separately closable inner plastic film liner or bag which is separately formed and later inserted into the container. Two-step manufacturing processes and subsequent assembly steps are typical in the manufacture of containers of this type, as may be seen, for example, in U.S. Pat. Nos. 4,065,049; 3,648,882; 3,101,839; 3,055,568; and 2,920,967.

It is, of course, also well known to coextrude multilayer bags and containers as shown in U.S. Pat. Nos. 3,896,991; 4,064,302; 4,151,318, 4,303,710; and 4,357,191. In each instance, however, the multiple layers are bonded together, thus precluding separation of an inner liner to faciliitate separate and independent closure of the liner.

It is further known in the prior art to form multi-layer bags which contain fully or partially attached liners, wherein sheet material for the various layers is continuously processed through a number of workstations where the multi-layered web is folded, glued, cut, etc. to form a finished container. Exemplary of such processes are U.S. Pat. Nos. 3,929,275 and 3,269,643.

In the present invention, a process is disclosed for forming a separable laminate container in a far simpler and less costly process than has heretofore been possible. According to this invention, at least two layers of non-adhering thermoplastic material are coextruded to form a multi-layered, tubular parison which is subsequently blow molded to the desired container shape. After trimming, a container body is produced which includes a thin film plastic liner which may be easily pulled away from the container body side walls to the extent required to roll down, fold, or otherwise seal, as by heat sealing, the open end of the liner.

In one exemplary embodiment of the invention, the outer layer which will form the container body is extruded at a thickness which, after blow molding, will be in the range of about 10 to about 50 mil. The inner layer which will form the container liner is extruded at a thickness which, after blow molding, will be in the range of about 0.5 to about 10 mil and, preferably about 0.5 to 3 mil. The thicknesses of the respective layers are chosen such that the container body will be stable, or self-supporting, while the liner will be non-self-supporting. In this regard, thicknesses up to 10 mil are generally characterized as non-self-supporting thin film material, while thicknesses above 10 mil are generally regarded as self-supporting.

After coextrusion, the multi-layer tubular parison is blow molded to form a container blank of desired shape, which may be round, rectangular, square and so on. In a subsequent step, at a nearby workstation or, as later explained, while the container is still in the mold, a tapered upper portion of the blow molded container blank is removed by cutting, thereby creating an open end of the same diameter or profile as the remainder of the container body.

If the cutting tool is adjusted to cut both layers of material, the inner liner will be axially coextensive with the outer container wall. If it is desirable to provide additional liner material to further facilitate folding, rolling down, etc., then the knife may be adjusted to penetrate the outer layer only. Subsequently, the inner liner, which now extends beyond the outer container wall, may be trimmed as desired.

After filling, the inner liner may be separated from the outer container merely by pulling the liner radially inwardly at the open end to separate it from the interior side wall surfaces of the container. The free end of the liner may thereafter be closed in any number of ways. For example, it may be gathered and tied, flattened and folded or rolled down, heat sealed, etc. If desired, a container lid may threafter be applied to the open end of the container.

As described further herein, a number of plastic materials may be employed to form the laminates. It is important, of course that no adhesives be added to the plastic material compositions in order to preclude bonding of the laminates. On the other hand, separating agents may be employed, if necessary or desired, to assure separation.

It is therefore the principal object of this invention to provide a process for simple and efficient manufacture of containers with linings or layers which may be separately closed, without any need for separate fabrication and subsequent assembly operations typically found in the prior art. Other objects and advantages will become apparent from the detailed disclosure which follows.

DETAILED DESCRIPTION OF THE INVENTION

Figure 1:
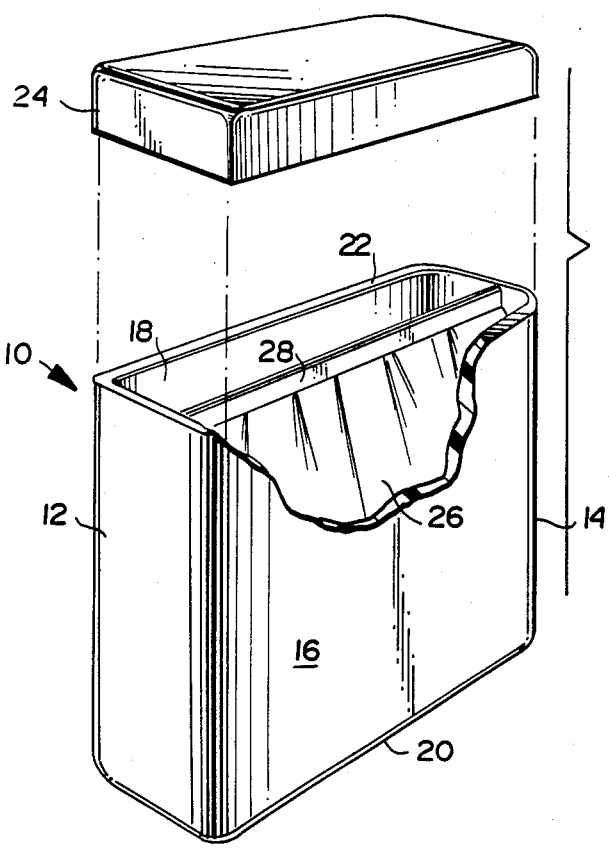
FIG. 1 is an exploded perspective view of a separable laminate container formed in accordance with an exemplary embodiment of the invention.

Referring now to FIG. 1, a separable laminate, coextruded container in accordance with one exemplary embodiment is shown which includes a generally rectangular body portion 10 comprised of side walls 12, 14, 16 and 18 and an integral bottom wall 20.

The container is preferably formed with an open end 22 which may receive a lid 24. Lid 24 may be of any conventional type and may be secured to the container in any suitable fashion, e.g. by a snap-on or friction-fit engagement.

A plastic film inner liner 26 is shown within the container with its upper edge sealed along a seam 28.

As may be appreciated from the cut-away depiction in FIG. 1, the inner liner 26 has been pulled away from the interior walls of the container to permit the open end of the liner to be pinched or flattened so as to form the longitudinal seam 28, extending substantially along the entire width of the container. It will be understood that where deemed sufficient, the liner 26 may be closed merely by rolling or folding down the seam 28 to the extent desired. If greater sealing action is required, the seam may be heat sealed in a conventional manner.

It will further be appreciated that the liner 26 may have an axial length greater than that of the container to further facilitate the closing thereof by any of the means described above. The manner in which this is accomplished is described in detail hereinbelow.

The outside layer which forms the container body is constructed of a plastic material such as polyethylene, polpropylene, polyvinylchloride (PVC), polycarbonate, polystyrene, or any other suitable thermoplastic material. The inner layer or liner is preferably formed of plastic materials known to be good gas and/or moisture barriers such as polyethylene, polypropylene, PVC, nylon, ethylene-vinyl alcohol copolymers, acrylonitriles, or any other suitable thermoplastic material. Like or different materials may be paired, so long as they have non-adhering characterisics, even at extrusion temperatures. It will be understood, of course, that no adhesive ingredients are added to the plastic compositions and, if necessary, a suitable agent may be employed to assure delamination or separation of the layers upon exertion of a minimal pulling force by the ultimate user of the container.

In general, containers formed in accordance with this invention will be relatively rigid, i.e., self-supporting. Thicknesses of the outer layer, or container walls, are preferably on the order of 10 to 50 mil, but thicknesses up to about 500 mil are possible. In addition, while reference is made herein to a single outer layer, it should be understood that the outer layer which is to form the container body may be a laminated structure comprised of a plurality of bonded layers. The inner layer, or liner, on the other hand, will be in the form of a non-self-supporting, thin plastic film of between about 0.50 and 10 mil, and preferably between about 0.50 and 3 mil.

Figure 2:
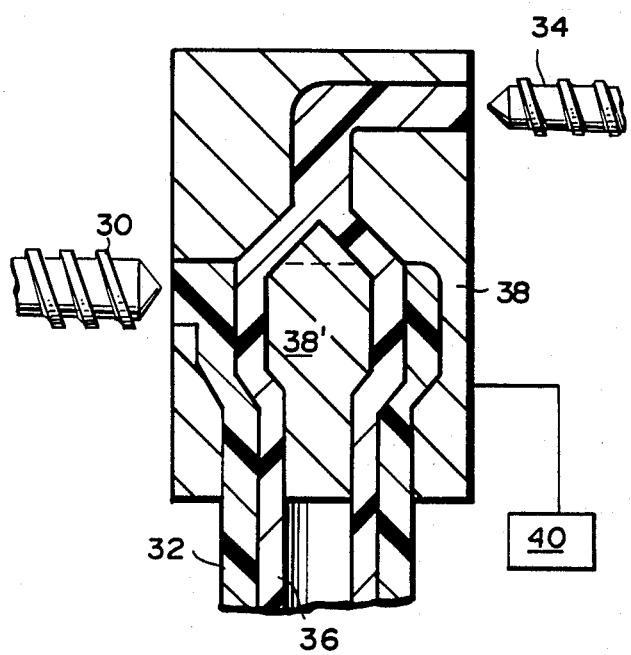
FIG. 2 is a partially schematic cross-section of an extrusion head for use in this invention.

FIGS. 2 through 8 illustrate apparatus used to produce containers in accordance with this invention. Thus, FIG. 2 illustrates, in schematic form, a conventional coextruding machine including a main extruder 30 for extruding the outer layer 32, and a satellite extruder 34 for extruding the inner layer 36. The combined extrudate exits a die head 38 which, though a conventional thickness control device 40, can be adjusted relative to a mandrel 38' to extrude the layers 32, 36 at desired, predetermined thicknesses.

Figure 3:
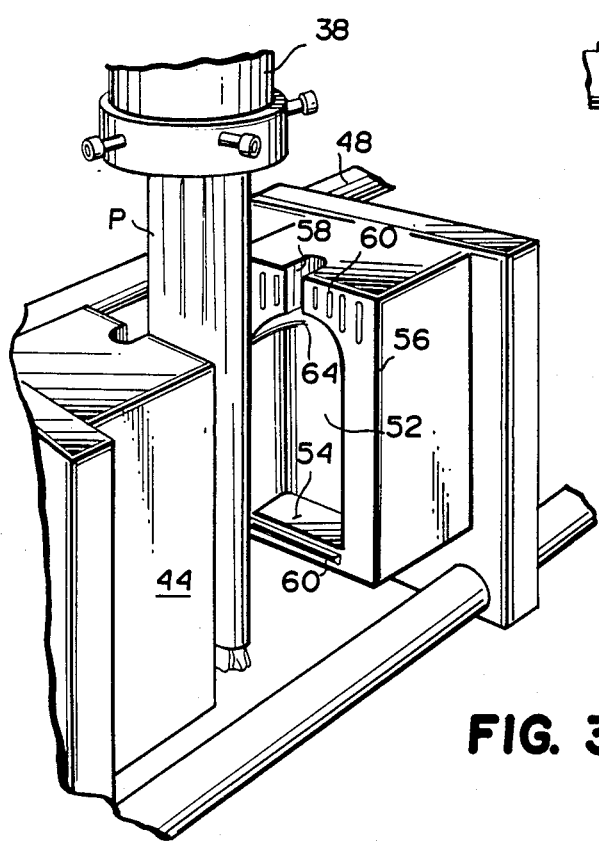
FIG. 3 is a perspective view of a blow molded parison formed in accordance with this invention, and inserted between open mold halves of a blow molding machine located in close proximity to the parison.

In FIG. 3, the parison P is shown extruded into free air from the die head 38. Also shown are a pair of split mold halves 44, 46 which have been shuttled vertically upwardly in a conventional manner to a position where the mold halves are located on either side of the parison P. The mold halves are also movable laterally toward the parison, along tie bars, or guideways 48, 50, by suitable drive means (not shown) to capture the parison for a subsequent blow molding operation.

Together, the mold halves define a cavity which determines the shape of the finished container. It will be understood that the cavity may be formed to provide a number of container shapes, such as generally cylindrical, rectangular, square, oval, etc. and wherein, for example, the upper portion may be tapered relative to a lower portion. Thus, great flexibility in the production of containers is afforded by the present invention.

The mold halves are substantially identical and, therefore, only one need be described in detail.

As best seen in FIGS. 3 through 6, the interior cavity 52 of mold half 46 incudes surfaces 52 and 54 which correspond to the side and bottom walls, respectively, of the finished container. The mold also includes a neck portion 56 and an opening 58, through which a blow pin will be inserted for later introducing a pressurized gas, such as air, into the mold cavity. An elongated rib 60 extends across the lower portion of one of the mold halves for a purpose to be described further herein. During the clamping operation, the lower edges of the mold pinch off the scrap extrudate from the previous parison, thereby forming the bottom wall of the container, as well as a residual tab element 62 which is discussed further on in this disclosure.

Line 64 in FIG. 3 corresponds to the location of the upper free or open end of the container, i.e., the material above the line is to be trimmed as explained in greater detail below.

Figure 4:
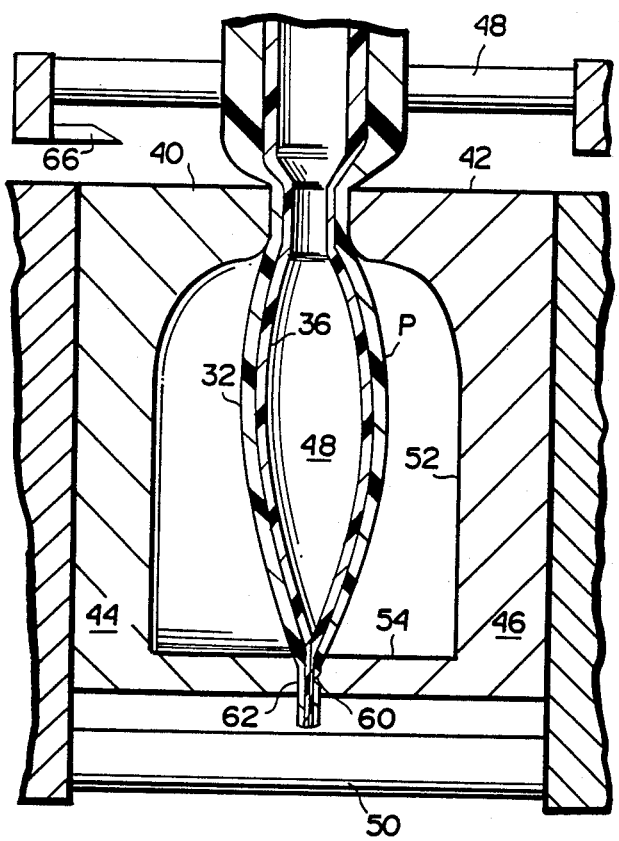
FIG. 4 is a cross-sectional view of a mold illustrating a container blank clamped therein prior to blow molding.
Figure 5:
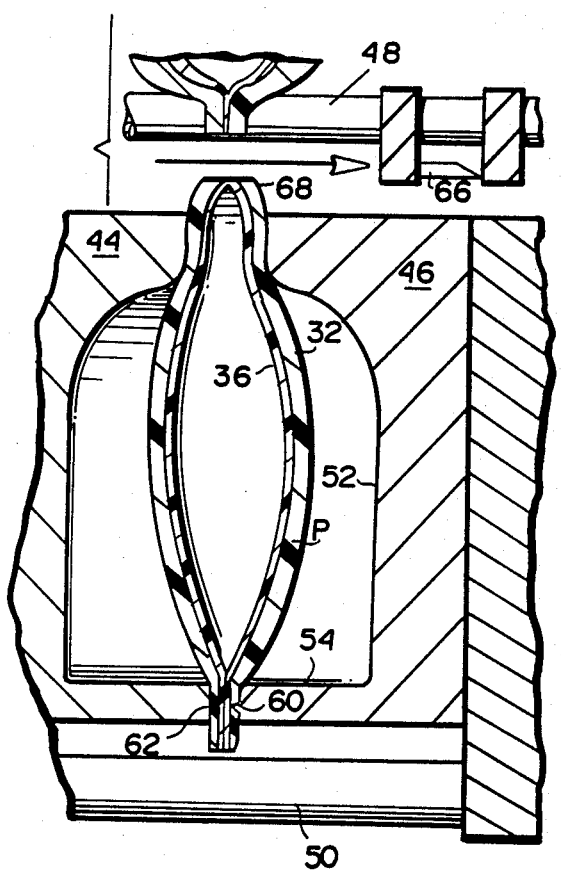
FIG. 5 is a view similar to that shown in FIG. 4 and further illustrating the cutting of the upper end of the parison.

To initiate the blow molding process, mold halves 44, 46 are closed about the parison. During clamping, a small amount of air is introduced into the parison through the extrusion die head, possibly causing the parison to expand slightly, as shown in FIGS. 4 and 5. This so-called "pre-blown" step provides support for the parison within the mold during the subsequent cutting step and shuttle to the blow molding station.

Figure 6:
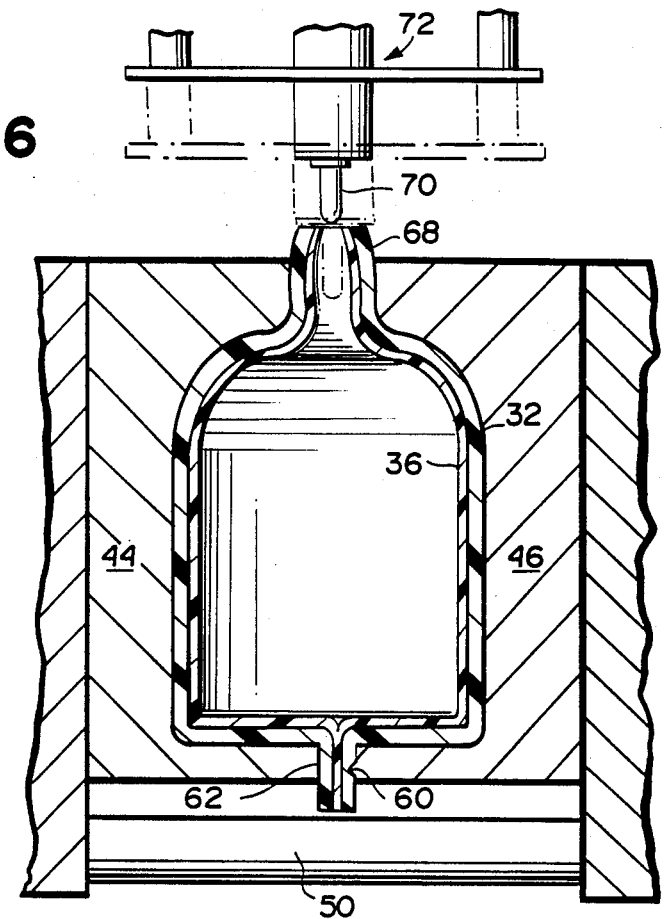
FIG. 6 is a partial cross-sectional view of a blow molded container within a mold.

A reciprocally movable knife 66 is thereafter moved laterally across the top of the parison to sever the parison just above the blow mold cavity, as will be understood from FIGS. 4 and 5, possibly causing the upper free end 68 of the parison P to close or partially close, as shown in FIG. 5. The mold is then shuttled to a blow molding station where a blow pin 70, (or other conventional device, including blow needles) formed as part of a blow head assembly 72, is introduced into the clamped parison, as shown in FIG. 6. An initial, short blast of air is directed at the free end 68 to open the parison sufficiently to permit entry of the blow pin. After introduction of the blow device, pressurized air or other suitable gas is introduced to expand the pre-blown parison against the interior walls of the mold cavity, it being understood that the thicknesses of the respective inner and outer layers are reduced as the parison is expanded. The degree of thinning must, of course, be taken into account when initially adjusting the gap at the die head so that the thickness of the inner and outer layers of the finished product may be controlled with accuracy.

As previously mentioned, it is desirable that the outer layer 36 which will form the container body per se, be of a thickness which will produce a self-supporting container, such as 10 to 50 or more mil. As previously stated, the container body itself may be formed of one or more bonded layers, coextruded in a conventional manner, but together with a separable layer or laminate in accordance with this invention. It is also preferred that the inner layer which will form the liner be of a thickness in the plastics film range of from about 0.50 to 10 mil.

Figure 7:
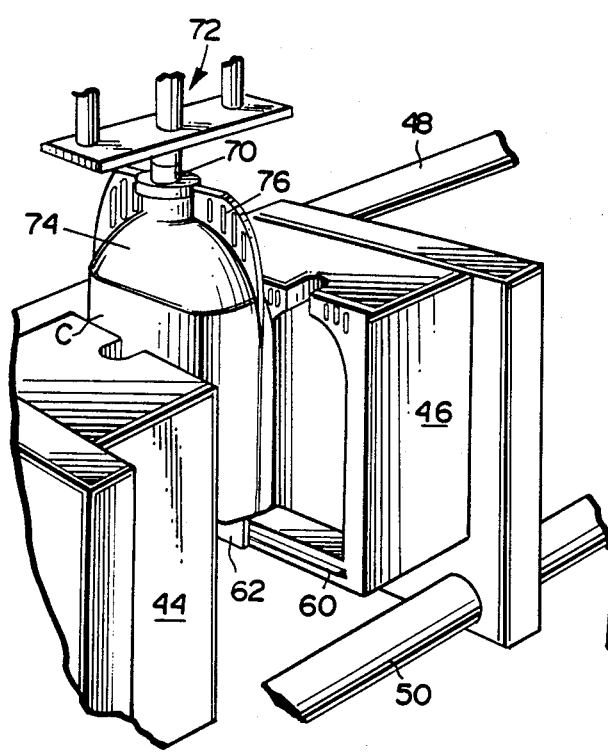
FIG. 7 is a perspective view illustrating a container blank formed in accordance with the invention, just after blow molding, and separated from the mold halves.

Upon completion of the blow molding operation, mold halves 44, 46 are separated and moved away from the container on the tie bars 48, 50, as best seen in FIG. 7.

FIG. 7 also illustrates container C in intermediate blank form, prior to trimming, as it appears upon separation of the mold halves 44, 46. The upper portion 74, including flash 76, and which constitutes that part of the container extending above line 64 in the mold cavity, is removed in a subsequent trimming operation.

Figure 8:
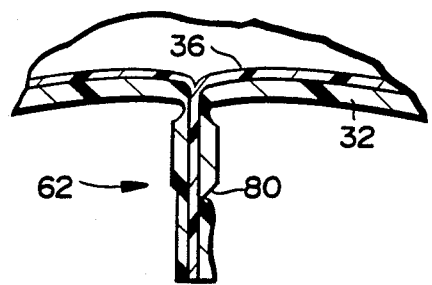
FIGS. 8 and 9 illustrate in detail one manner in which the bottom of the container may be sealed at the mold parting line.
Figure 9:
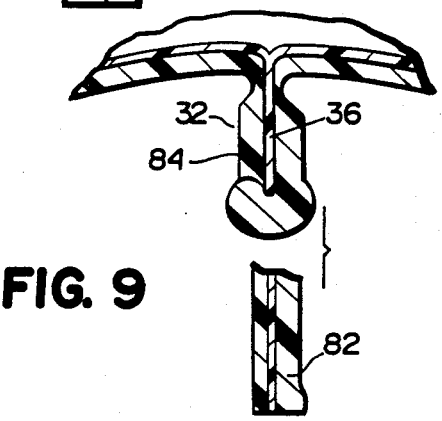

Referring back now to FIGS. 4 and 5 it may be seen that when the bottom of the container is pinched off by mold halves 44, 46, the inner layer 36 extends through the bottom wall of the outer container along a line across the bottom thereof, corresponding to a portion of the parting line of the mold halves forming the remaining residual tab 62. Since the inner and outer layers of material are designed to be easily separable, measures must be taken to seal the container along the middle portion of the bottom wall to prevent separation of bottom wall halves along the parting line. To this end, and as best seen in FIGS. 8 and 9, the residual tab 62 extending across the container bottom wall is notched at 80 by the rib 60 formed in one of the mold halves, or by any other suitable means, so that during the subsequent trimming operation, a free end 82 of the flash is removed. A remaining residual tab portion 84 is thereafter heated and deformed to encapsulate the inner layer and to provide a continuous bottom wall of the outer layer material, as shown in FIG. 9.

Figure 10:
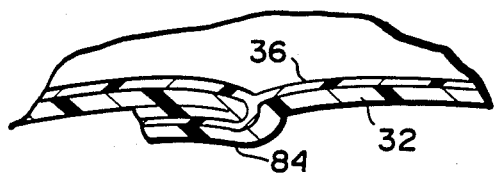
FIG. 10 illustrates an alternative manner in which the bottom of the container may be sealed at the mold parting line.

FIG. 10 illustrates an alternative embodiment where the residual tab portion 84 is folded over and bonded to the adjacent outer layer material. This may be done mechanically after heating the outer layer material to a molten state, and with or without additional use of an adhesive.

Trimming of the upper portion of the container may occur at a separate workstation. In one embodiment of the invention, and with reference to FIG. 11, blow head 72 carries the intermediate container to a trim mold 86 comprising mold halves 90, 92 slidably mounted on tie bars 94, 96. Mold 86 is clamped about the container such that portion 74 to be removed projects upwardly therefrom. A flying knife 98 including a rotary blade 100 is thereafter brought into engagement with the container to remove portion 74, to produce a finished container C as partially shown in FIG. 12.

Figure 11:
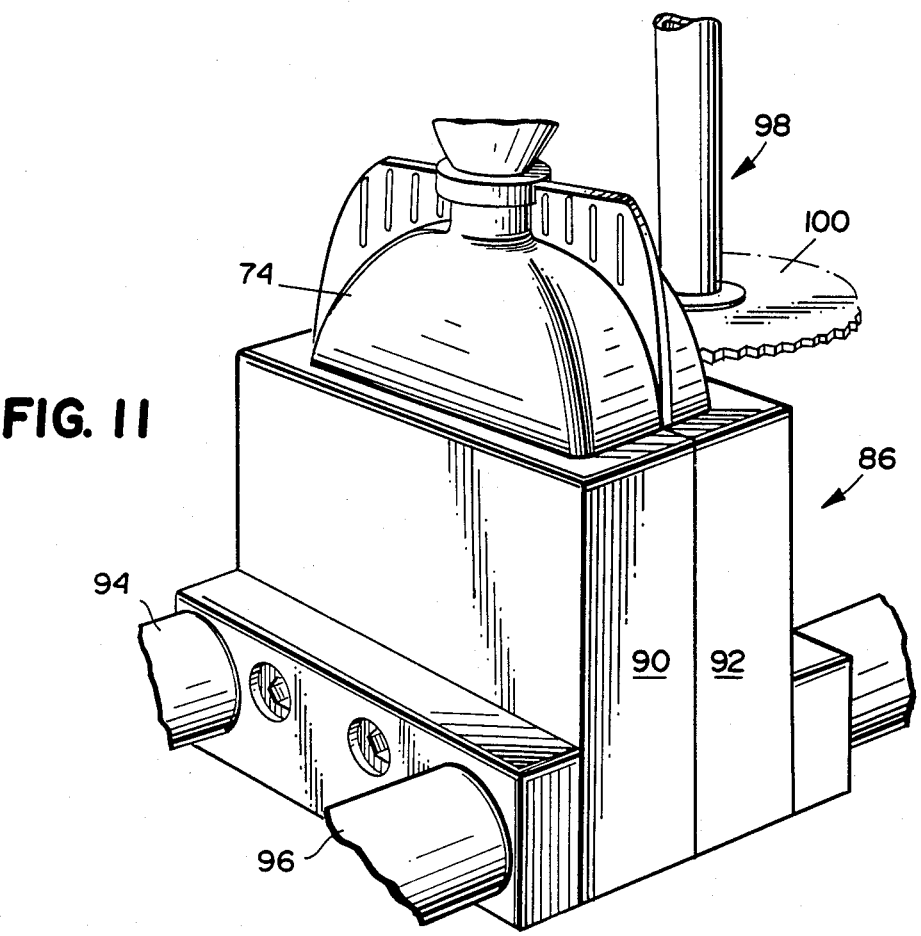
FIGS. 11 and 12 are perspective views illustrating a container blank and an associated trimming knife for trimming the container in accordance with one exemplary embodiment of the invention.
Figure 12:
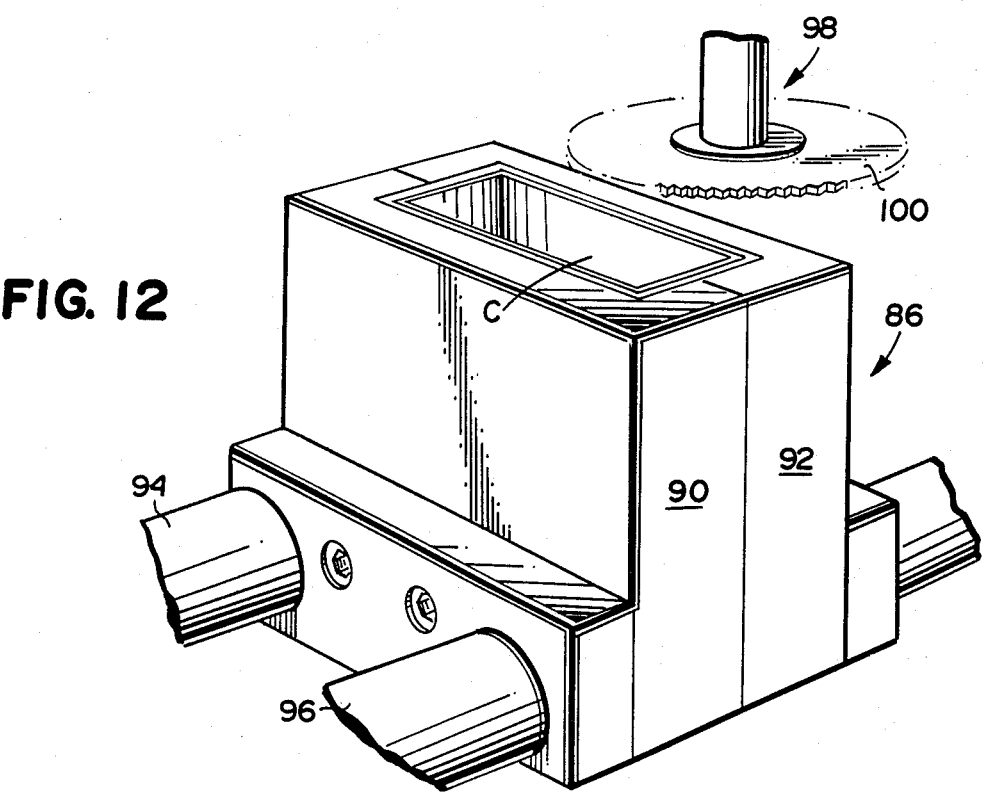

As shown in FIGS. 11 and 12, the cutting knife 98 severs both inner and outer layers of the container, so that the liner 26 extends to the upper edge of the open container end. While this may prove sufficient in some cases, in terms of liner material available for forming an effective seal, nevertheless it may be desirable to provide additional liner material to further facilitate closing of the liner. In such case, knife 98 may be adjusted to swing about the periphery of the container, cutting only through the outer layer, or container body portion. This upper portion 74 may then be removed, leaving a liner portion extending above the container body. This, of course, is possible by reason of the separable nature of layers 32, 36. The liner may then be trimmed to the desired axial length. This arrangement is particularly beneficial where the free edge of the liner will be rolled or folded to close same.

Figure 13:
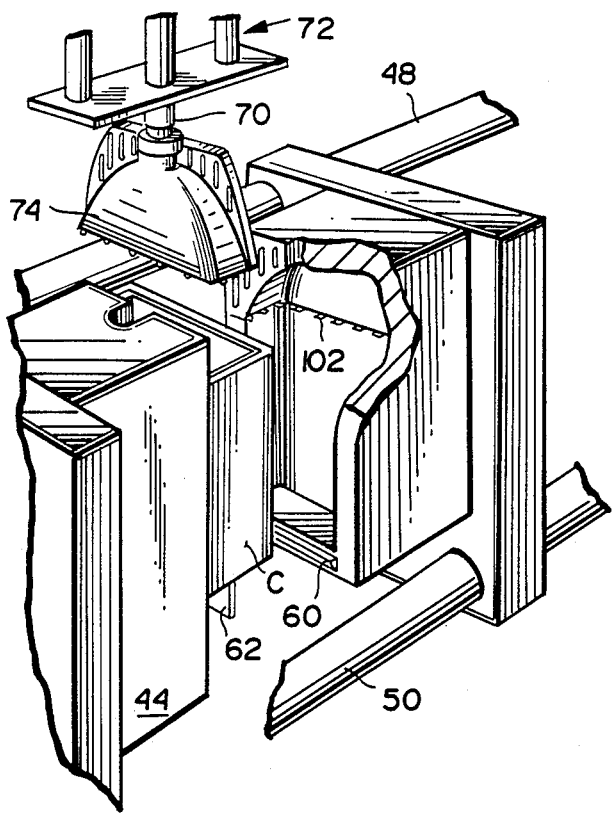
FIG. 13 is a perspective view illustrating an alternative manner by which the upper part of the container blank may be severed while still in the mold.

FIG. 13 illustrates an alternative manner by which scrap portion 74 may be removed from the container. In this embodiment, a series of knife blades 102 are provided within the blow molding cavity, and which may be actuated in an explosion cutting operation, as is known in the art, to sever the scrap portion 74 after the blow molding operation is completed, but while the container is still in the mold. Upon separating the mold halves, container body C drops onto a conveyor (not shown) for transport to another workstation where flash 78 is removed. At the same time, blow head 72 carries upper scrap portion 74 away to a suitable discharge and subsequent recycling.

It is noted that the blow pin and trimming tool arrangements have been described in an exemplary manner only, it being understood that there are a number of blow molding set-ups which can be employed in the process of this invention.

Figure 14:
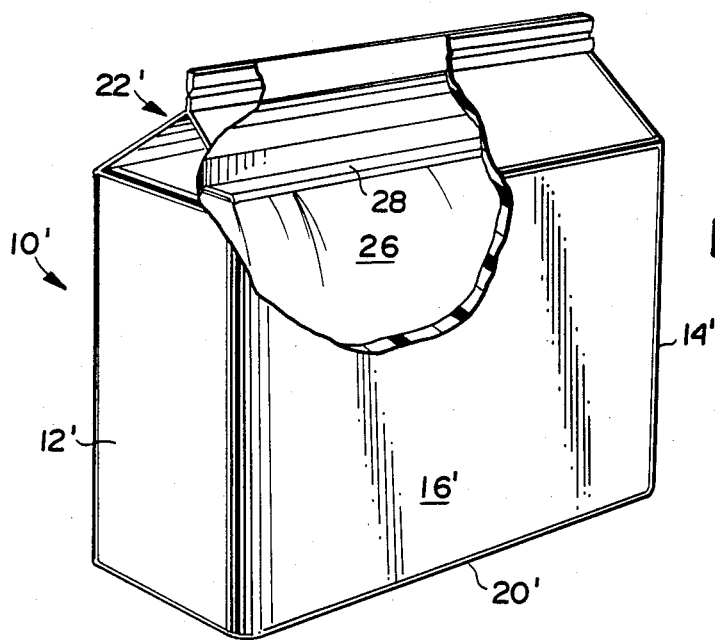
FIG. 14 is a perspective view, partially cut away, of a container formed in accordance with an alternative embodiment of the invention.

FIG. 14 illustrates an alternative embodiment of the invention wherein the container body 10', including side walls 12', 14', 16', 18' and bottom wall 20', is formed of a thickness which permits the upper free end 22' thereof to be folded much in the same manner as a milk carton or the like. At the same time, liner 26 is separately closed and sealed within the container, prior to heat sealing the upper free edge of the container.

Once the container is formed as described hereinabove, it will be transferred to a filling station, or shipped to a remote location for filling, after which the free end of the liner will be separated from the outer container walls and closed in any of the methods described hereinabove. A relatively rigid lid, such as shown in FIG. 1 at 24, may thereafter be applied to the container.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A process for forming, filling and closing a separable laminate container comprising the steps of:

(a) extruding at least two substantially non-adhering plastic compositions to form a tubular parison having a relatively thick outer layer and a relatively thin inner layer;
(b) molding said parison within a mold cavity to form a container having side walls, a closed end, and an open end such that said relatively thick outer layer forms a container body and said relatively thin inner layer forms an open ended liner for said container body;
(c) trimming the molded container, at said open to provide access to said open ended liner.
(d) filling the open ended liner;
(e) pulling the liner inwardly away from the side walls of the container body at the open end thereof to at least partially separate the liner from the container body and
(f) closing the liner at said open end thereof 2. A process according to claim 1 wherein, during step (c) the container is trimmed so that said liner extends beyond the open end of the container body.

3. A process according to claim 1 wherein said container body has a thickness of from about 10 to about 50 mil and said liner has a thickness of from about 0.50 to about 3 mil.

4. A process according to claim 1 wherein said container is substantially rectangular.

5. A process according to claim 1 wherein said container is substantially cylindrical.

6. A process according to claim 1 wherein step (b) is practiced by blow molding said parison within a mold cavity formed by split mold halves which are brought together to clap said parison therebetween.

7. A process according to claim 1 wherein step (b) is practiced by blow molding said parison within a mold cavity to form a container blank having a necked-in portion, and thereafter, during step (c), trimming the blow molded container to remove the necked-in portion so tha the container body has a substantially uniform cross-sectional shape from the bottom to the open end thereof.

8. A process according to claim 1 and including the further step of applying a lid to said container.

9. A process according to claim 1 and wherein step (f) is practiced by flattening the open end of said liner to form opposed edges, and heat sealing said edges.

10. A process according to claim 1 wherein said relatively thick outer layer comprises a thermoplastic material.

11. A process according to claim 10 wherein said thermoplastic material forming said relatively thick outer layer is selected from the group consisting of polyethylene, polypropylene, polyvinylchloride, polycarbonate, and polystyrene.

12. A process according to claim 1 wherein said relatively thin inner layer is a thermoplastic material.

13. A process according to claim 12 wherein said thermoplastic material forming said relatively thin inner layer is selected from the group consisting of polyethylene, polypropylene, polyvinylchloride, nylon, ethylene-vinyl alcohol copolymers, and acrylonitriles.

14. A process according to claim 11 wherein said plastic composition forming said relatively thin inner layer is a thermoplastic material selected from the group consisting of polyethylene, polypropylene, polyvinylchloride, nylon, ethylene-vinyl alcohol copolymers, and acrylonitriles.

15. A process for forming a separable laminate container comprising:
(a) extruding at least two substantially non-adhering plastic compositions to form a tubular parison having a relatively thick outer layer and a relatively thin inner layer;
(b) blow molding said parison within a mold cavity formed by split mold halves which are brought together along a mold parting line to clamp said parison therebetween, thereby forming a container having side walls, a closed end and an open end, wherein said relatively thick outer layer forms a container body and said relatively thin inner layer forms an open ended liner for said container body; and further wherein the closed end of the container body includes a bottom wall divided into halves along a depending residual tab formed during clamping of said parison by said mold halves, said tab comprising depending outer layer portions separated by a depending inner layer portion;
(c) reworking said tab to join said divided bottom wall halves;
(d) filling said container;
(e) pulling said liner away from said container body portion at the open end thereof sufficient to join opposed peripheral edges of said liner;
(f) closing said opposed peripheral edges of said liner; and
(g) closing said outer body portion of said container.

16. A process according to claim 1 wherein the closed end of the container body includes a bottom wall divided into halves along a depending residual tab formed during clamping of said parison by mold halves along a portion of a mold parting line defined by said mold halves, said tab comprising outer layer portions separated by a depending inner layer portion, the process including the further step of reworking said tab to join said divided bottom wall halves.

17. A process according to claim 16 wherein said reworking step comprises:
trimming a free end portion of said tab, leaving a residual tab portion; and
deforming the residual portion to encapsulate said inner layer portion.

18. A process according to claim 16 wherein said reworking step comprises:
trimming a free end portion of said tab, leaving a residual tab portion; and
folding said residual tab over onto an adjacent bottom wall surface and bonding said residual tab thereto.

19. A process according to claim 15 wherein said liner extends axially beyond said side walls of said container body.

20. A process according to claim 15 and wherein step (g) is carried out by applying a lid to said container body.

21. A process according to claim 15 wherein said container body has a thickness of from about 10 to about 50 mil and said liner has a thickness of from about 0.50 to about 3 mil.

22. A process according to claim 15 wherein said first plastic material is selected from the group consisting of polyethylene, polpropylene, polyvinylchloride, polycarbonate, and polystyrene.

23. A process according to claim 15 wherein said second plastic material is selected from the group consisting of polyethylene, polypropylene, polyvinylchloride, nylon, ethylene-vinyl alcohol copolymers, and acrylonitriles.

24. A process according to claim 22 wherein said second plastic material is selected from the group consisting of polyethylene, polypropylene, polyvinylchloride, nylon, ethylene-vinyl alcohol copolymers, and acrylonitriles.

25. A process according to claim 15 wherein said opposed peripheral edges of said liner are closed by folding.

26. A process according to claim 15 wherein said opposed edges are closed by heat sealing.

27. A process according to claim 15 wherein said outer body portion of said container is closed by folding and sealing.

28. A process according to claim 15 wherein said reworking step comprises:
- trimming a free end portion of said tab, leaving a residual tab portion; and
- deforming the residual portion to encapsulate said inner layer portion.

29. A process according to claim 15 wherein said reworking step comprises:
- trimming a free end portion of said tab, leaving a residual tab portion; and
- folding said residual tab over onto an adjacent bottom wall surface and bonding said residual tab thereto.

* * * * *